United States Patent [19]

Tokuoka

[11] 4,339,425
[45] Jul. 13, 1982

[54] PROCESS FOR PRODUCING ACICULAR HYDRATED FERRIC OXIDE PARTICLES

[75] Inventor: Yasumichi Tokuoka, Tokyo, Japan

[73] Assignee: TDK Electronics Co., Ltd., Tokyo, Japan

[21] Appl. No.: 210,351

[22] Filed: Nov. 25, 1980

[30] Foreign Application Priority Data

Jan. 22, 1980 [JP] Japan ..................... 55/5269

[51] Int. Cl.$^3$ ............................................. C01G 49/06
[52] U.S. Cl. .................................... 423/633; 423/632; 423/634; 252/62.56
[58] Field of Search ............... 252/62.56; 423/632, 423/633, 634

[56] References Cited

U.S. PATENT DOCUMENTS

3,075,919  1/1963  Gruber et al. .................... 423/634

FOREIGN PATENT DOCUMENTS

44-14090  6/1969  Japan ............................... 423/634

*Primary Examiner*—Jack Cooper
*Attorney, Agent, or Firm*—Oblon, Fisher, Spivak, McClelland & Maier

[57] ABSTRACT

Acicular hydrated ferric oxide particles are produced by premixing an aged ferric hydroxide with a newly formed ferric hydroxide or a mixture of ferrous hydroxide and an oxidizing agent and treating the pre-mixture by a hydrothermal reaction of said pre-mixture at 100° to 250° C.

1 Claim, No Drawings

PROCESS FOR PRODUCING ACICULAR HYDRATED FERRIC OXIDE PARTICLES

BACKGROUND OF THE INVENTION

1. FIELD OF THE INVENTION

The present invention relates to a process for producing a hydrated iron oxide. More particularly, it relates to an economical process for producing hydrated iron oxide particles used as a starting material for producing iron type acicular magnetic particles which are usually used for magnetic recording media.

2. DESCRIPTION OF THE PRIOR ART

Recently, hydrated iron oxide particles have been used in various fields and the demand for the hydrated iron oxide particles has been increased as pigments, a source of ferrite and a source for production of magnetic particles for a magnetic recording medium.

When the hydrated iron oxide particles are used as the source for production of the magnetic particles for a magnetic recording medium, the shape of the hydrated iron oxide particles directly relates to the shape of the magnetic particles. Therefore, it is necessary to produce hydrated iron oxide particles having a shape corresponding to a desired shape of the magnetic particles suitable for the magnetic recording medium.

It is well known that the important characteristics of magnetic particles for magnetic recording include a coercive force of magnetic particles, a dispersibility of magnetic particles in a magnetic paint for coating and an orientation of magnetic particles in a magnetic recording tape. As it is well known, these characteristics are important factors which highly affect to the characteristics of the magnetic recording tape. The shape of the magnetic particle directly relates to these characteristics of the magnetic particles. For example, when the coercive force is given by the shape anisotropy as the conventional magnetic recording medium, the coercive force is increased depending upon the improvement of the acicular property of the particles. The dispersibility is improved by decreasing branched or curved particles whereby the steric hindrance is decreased to improve the orientation and accordingly, the recording characteristics of the magnetic recording tape are improved. Therefore, it is important to obtain a magnetic particle having excellent acicular property with smaller branched shape in the preparation of the magnetic particles for a magnetic recording medium. In the industrial process, hydrated ferric oxide which is mainly goethite α-FeOOH which easily forms an acicular particle is firstly produced as a starting material and is converted into a magnetic metallic iron particle by heating, dehydrating and reducing it or is converted into $Fe_3O_4$ particles by partially reducing it or is converted into γ-$Fe_2O_3$ particles by oxidizing the product.

In this process, the acicular property of the resulting particles depends on the shape of the starting goethite and accordingly, the shape of the goethite particles should be controlled. Therefore, it is important to provide an economical process for producing goethite particles having the desired shape in high efficiency in order to produce the magnetic particles for a magnetic recording medium.

In the conventional process for producing goethite which has been studied and employed as the industrial process, the ferrous hydroxide precipitate obtained by adding a base to a ferrous salt is oxidized in an acidic, neutral or alkaline solution. Various goethite particles having various shapes have been obtained by controlling the concentration of iron ion in the solution, pH of the solution, the temperature or the oxidation reaction velocity. However, in the conventional process, the goethite crystalline particles are precipitated depending upon mild oxidation of ferrous ion whereby it takes long time for the reaction and it is difficult to maintain the uniform oxidation reaction under a constant reaction condition. As a result, distribution of sizes of the resulting particles is broadened. In the conventional process, it is considered that hexagonal plate green rust is formed as the intermediate in the step of converting from ferrous hydroxide to goethite, and the dissolution of the green rust, the oxidation of ferrous ion and the precipitation of goethite as epitaxial reaction result on the surface of the particles. Therefore, goethite particles having a branched shape having an angle of about 120 degree are easily produced. This is a serious disadvantage.

As the other process for producing goethite, it has been known to use a ferric salt such as ferric chloride as the starting material. In this process, a ferric hydroxide precipitate is formed by adding a strong base to the ferric salt and the precipitate is converted into goethite by a hydrothermal reaction as the principle process. In this process, any oxidation is not required in comparison with the case using the ferrous salt as the starting material, and accordingly, the above-mentioned disadvantages can be eliminated. This process is remarkably advantageous in view of a production of the goethite particles having uniform distribution of sizes without branched shapes by utilization of the rapid goethite crystal growth reaction in the heating operation. However, this process has disadvantages in that it is necessary to form seeds of goethite before the hydrothermal reaction because this process utilizes the rapid crystal growth reaction under the condition of high temperature and high pressure. Even though the hydrothermal reaction is carried out without any ageing for forming seeds, only rough goethite particles or powdery hematite is produced. In order to produce suitable goethite particles, it is necessary to carry out the ageing treatment such as ageing at room temperature for about 24 hours. Thus, the conventional process for producing goethite from the ferric salt as the starting material also has the disadvantage of such requirement in the operation which should be improved.

SUMMARY OF THE INVENTION

It is an object of the present invention to overcome the disadvantage of the conventional process for producing goethite and to provide an economical process for producing an acicular hydrated ferric oxide particles which can be easily converted into acicular goethite particles having uniform particle size distribution without branched shape.

The foregoing and other objects of the present invention have been attained by producing acicular hydrated ferric oxide particles by premixing an aged ferric hydroxide precipitate with a newly formed ferric hydroxide or a mixture of ferrous hydroxide and an oxidizing agent and performing a hydrothermal reaction of said pre-mixture at 100° to 250° C.

DETAILED DESCRIPTION OF THE PREFERRED EMBODIMENTS

Various studies have been made to find the fact that acicular goethite particles having uniform particle size distribution without branched shape can be produced in excellent reproducibility by premixing an aged ferric hydroxide precipitate with a ferrous hydroxide or ferric hydroxide precipitate even though the mixture is treated by the hydrothermal reaction. It has been also found the resulting goethite particles have the same size as the goethite particles obtained by the hydrothermal reaction of the aged ferric hydroxide precipitate.

It is considered that the aged ferric hydroxide precipitate which is premixed before the hydrothermal reaction contains goethite seeds whereby the effect of the seeds is imparted to be effective for the formation of goethite from the ferrous hydroxide or ferric hydroxide precipitate in the hydrothermal reaction.

The aged ferric hydroxide precipitate used as the seeds is obtained by ageing a ferric hydroxide precipitate at room temperature to 70° C. for 3 to 30 hours. The effect of the present invention is imparted by incorporating the aged ferric hydroxide precipitate at a molar ratio of more than 1:4 based on the total precipitates used for the hydrothermal reaction. The upper limit of the amount of the aged ferric hydroxide precipitate is not critical. If a large amount of the aged ferric hydroxide precipitate is used, the effect for reducing the ageing step is not remarkable and accordingly, the upper limit might be less than about 1:2 based on the total precipitates.

When the process of the present invention is carried out by using ferrous hydroxide precipitate, it is necessary to incorporate an oxidizing agent together with the aged ferric hydroxide precipitate in the hydrothermal reaction.

Suitable oxidizing agents include hydrogen peroxide; chlorates such as sodium chlorate and potassium chlorate; and nitrates such as sodium nitrate and potassium nitrate.

The hydrothermal reaction is carried out in an autoclave at 100° to 250° C. for 1 to 20 hours.

The aged ferric hydroxide seeds can be added to the newly formed ferrous hydroxide or ferric hydroxide precipitate. It is also possible to premix the aged ferric hydroxide precipitate in the step of mixing the ferrous or ferric salt with a base, if necessary with an oxidizing agent, as the step of forming the iron hydroxide precipitate.

It is possible to incorporate various additives for controlling the acicular ratio and the size of goethite or protecting from sintering in the following reduction step, for example, salts of zinc, nickel and cobalt and compounds of silicon, aluminum and phosphorus are used as the additives.

In accordance with the process of the present invention, the serious ageing step for using the ferric salt in the conventional process can be remarkably decreased and the requirement for treating the ferrous salt for a long time in the conventional process can be eliminated and the disadvantages of nonuniform particle size distribution and branched shape can be dissolved.

The goethite particles produced according to the present invention can be acicular crystals having uniform particle size distribution without branched or curved shape. When the goethite particles are converted into the magnetic particles by the next treatment, the magnetic particles impart excellent characteristics for the magnetic recording medium.

The present invention will be illustrated by certain examples and references which are provided for purposes of illustration only and are not intended to be limiting the present invention.

In the examples, the following product was used as the aged ferric hydroxide precipitate. Into 1 liter of 3 $M-FeCl_3$ aqueous solution, 4.5 liter of 2.7 M-NaOh aqueous solution was added dropwise at a rate of 50 ml per minute. The resulting ferric hydroxide precipitate was aged at room temperature for 24 hours. (This is referred as the aged slurry.)

In the examples, as the reference for particle shape of the resulting goethite, a goethite was produced by a hydrothermal reaction of the aged slurry in an autoclave at 150° C. for 1 hour. The resulting goethite particles had acicular property without branched shape and is referred as the standard goethite.

EXAMPLE 1

Into 6 liter of water, 370 g. of $KClO_3$ and 300 g. of NaOH were dissolved and the above-mentioned aged slurry was added to the mixture with vigorously stirring and 3 liter of 1 $M-FeSO_4$ aqueous solution was added dropwise to prepare a mixture of the aged ferric hydroxide and a newly produced ferrous hydroxide at equimolar ratio. The mixture with the mother liquor was treated by a hydrothermal reaction in an autoclave at 130° l C. for 2 hours. The resulting goethite particles had excellent acicular property without branched shape, and was the same as the standard goethite.

Therefore, the goethite having the same quality of the standard goethite can be produced by a simple step for a short time in comparison with the conventional process using the ferrous salt.

EXAMPLE 2

Into 8 liter of water, 490 g. of $KClO_3$ and 400 g. of NaOH were dissolved and the above-mentioned aged slurry was added with vigorously stirring and 4 liter of 1 $M-FeSO_4$ aqueous solution was added dropwise. The aged slurry was added to give a ratio of 1:3 equimol of the ferric hydroxide based on the newly produced ferrous hydroxide.

In accordance with the process of Example 1, the mixture was treated by a hydrothermal reaction in an autoclave at 150° C. for 1 hour. The resulting goethite particles had excellent acicular property without branched shape and was the same as the standard goethite.

EXAMPLE 3

In accordance with the process of Example 1 except that 0.1 liter of 1 $M-CoSO_4$ aqueous solution and 3.3 liter of 1 $M-FeSO_4$ aqueous solution was used instead of 3 liter of 1 $M-FeSO_4$ aqueous solution, a hydrothermal reaction was carried out. The resulting goethite particle had excellent acicular property without branched shape and was the same as the standard goethite.

EXAMPLE 4

300 Ml of 3 $M-FeCl_3$ aqueous solution was admixed with the aged slurry of Example 1 and NaOH was added with stirring to give pH of 13 and the reaction mixture was treated by a hydrothermal reaction in an autoclave at 150° C. for 2 hours. The resulting goethite particles had excellent acicular property without branched shape and was the same as the standard goethite.

REFERENCE 1

Into 6 liter of water, 370 g. of KClO$_3$ and 300 g. of NaOH were dissolved and 3 liter of 1 M-FeSO$_4$ aqueous solution was added to the solution and the reaction mixture was treated by a hydrothermal reaction in an autoclave at 150° C. for 1 hour. The resulting goethite particles contained many particles having the branched shape which are usually formed in the conventional process using a ferric salt.

REFERENCE 2

The ferric hydroxide precipitate used for the production of the standard goethite was charged into an autoclave without ageing and treated by a hydrothermal reaction at 150° C. for 1 hour. The resulting particles were a mixture of goethite particles and α-Fe$_2$O$_3$ particles.

I claim:

1. A process for producing acicular hydrated ferric oxide particles comprising mainly goethite without branch shapes which comprises premixing aged ferric hydroxide which has been aged by treating an aqueous ferric hydroxide slurry at a temperature between room temperature and 70° C. for 3 to 30 hours, with a newly formed ferric hydroxide or a mixture of ferrous hydroxide and an oxidizing agent, said aged ferric hydroxide being at a molar ratio of from 1:4 to 1:2 to the newly formed ferric hydroxide or ferrous hydroxide, and hydrothermally treating the premixture as a slurry in an autoclave at 100°–250° C. for 1 to 20 hours.

* * * * *